(12) United States Patent
Hu et al.

(10) Patent No.: US 11,714,631 B2
(45) Date of Patent: Aug. 1, 2023

(54) METHOD, ELECTRONIC DEVICE, AND COMPUTER PROGRAM PRODUCT FOR MANAGING OPERATING SYSTEM

(71) Applicant: EMC IP Holding Company LLC, Hopkinton, MA (US)

(72) Inventors: Chenxi Hu, Beijing (CN); Rui Song, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 107 days.

(21) Appl. No.: 17/534,783

(22) Filed: Nov. 24, 2021

(65) Prior Publication Data
US 2023/0126244 A1    Apr. 27, 2023

(30) Foreign Application Priority Data
Oct. 22, 2021  (CN) .......................... 202111235699.6

(51) Int. Cl.
| | | |
|---|---|---|
| *G06F 8/65* | (2018.01) | |
| *G06F 8/61* | (2018.01) | |
| *G06F 11/14* | (2006.01) | |
| *G06F 11/07* | (2006.01) | |
| *G06F 9/4401* | (2018.01) | |

(52) U.S. Cl.
CPC .................. *G06F 8/65* (2013.01); *G06F 8/63* (2013.01); *G06F 9/4406* (2013.01); *G06F 11/0772* (2013.01); *G06F 11/1433* (2013.01)

(58) Field of Classification Search
None
See application file for complete search history.

(56) References Cited

U.S. PATENT DOCUMENTS

| | | | | |
|---|---|---|---|---|
| 7,296,008 B2* | 11/2007 | Passed | ................ | G06F 11/1461 |
| 8,984,104 B2* | 3/2015 | Morgan | .............. | H04L 41/0813 |
| | | | | 709/221 |
| 2008/0177994 A1* | 7/2008 | Mayer | ..................... | G06F 16/00 |
| | | | | 709/224 |

(Continued)

OTHER PUBLICATIONS

R. Putman, "Dell Internal Dual SD Module," Dell Product Group White Paper, Mar. 2010, 10 pages.

(Continued)

*Primary Examiner* — Marina Lee
(74) *Attorney, Agent, or Firm* — Ryan, Mason & Lewis, LLP (57) ABSTRACT

Embodiments of the present disclosure provide a method, an electronic device, and a computer program product for managing an operating system. The method includes receiving a version upgrade request for the system. The method further includes using a target system image to upgrade the system from a first version to a second version corresponding to the target system image. The method further includes storing, in response to determining that the system operates normally within a first time period, the target system image to a first storage device for the system without updating a historical system image stored in a second storage device for the system, wherein the historical system image corresponds to the first version. In this way, by storing image files of different versions for selectively resetting the operating system in case of a failure, stability of the system after an upgrade is improved.

20 Claims, 6 Drawing Sheets

(56) References Cited

U.S. PATENT DOCUMENTS

2017/0228302 A1* 8/2017 Chiang .................. G06F 11/327
2021/0096956 A1* 4/2021 O'Dell ................. G06F 11/1464
2022/0197757 A1* 6/2022 Malamut ............... G06F 16/192

OTHER PUBLICATIONS

Dell EMC, "Dell EMC Data Domain® Operating System," Version 6.2 Administration Guide, 302-005-407, REV. 04, Mar. 2020, 560 pages.

* cited by examiner

METHOD, ELECTRONIC DEVICE, AND COMPUTER PROGRAM PRODUCT FOR MANAGING OPERATING SYSTEM

RELATED APPLICATION(S)

The present application claims priority to Chinese Patent Application No. 202111235699.6, filed Oct. 22, 2021, and entitled "Method, Electronic Device, and Computer Program Product for Managing Operating System," which is incorporated by reference herein in its entirety.

FIELD

Embodiments of the present disclosure relate to the field of computers, and more specifically, to a method, an electronic device, and a computer program product for managing an operating system.

BACKGROUND

A variety of different methods may be used for upgrading an operating system of an electronic device (such as a server). For example, one well-known approach involves using a Universal Serial Bus (USB) memory for upgrading. In this approach, when the operating system is being upgraded, it is first necessary to create a new version of an image file by using a specific software tool and writing the image file into the USB memory. After that, for example, by setting a system BIOS, where BIOS denotes Basic Input/Output System, the system can directly read and load the image file in the USB memory after startup. After the image file is loaded by the system, an installation program is started.

SUMMARY

Embodiments of the present disclosure provide an upgrading solution for managing an operating system.

In a first aspect of the present disclosure, a method for managing an operating system is provided. The method includes receiving a version upgrade request for the system. The method further includes using a target system image to upgrade the system from a first version to a second version corresponding to the target system image. The method further includes storing, in response to determining that the system operates normally within a first time period, the target system image to a first storage device for the system without updating a historical system image stored in a second storage device for the system, wherein the historical system image corresponds to the first version.

In a second aspect of the present disclosure, an electronic device is provided. The electronic device includes a processor; and a memory coupled to the processor, the memory having instructions stored therein, and the instructions, when executed by the processor, causing the device to execute actions. The actions include receiving a version upgrade request for a system. The actions further include using a target system image to upgrade the system from a first version to a second version corresponding to the target system image. The actions further include storing, in response to determining that the system operates normally within a first time period, the target system image to a first storage device for the system without updating a historical system image stored in a second storage device for the system, wherein the historical system image corresponds to the first version.

In a third aspect of the present disclosure, a computer program product is provided. The computer program product is tangibly stored on a computer-readable storage medium and includes machine-executable instructions. The machine-executable instructions, when executed by a machine, cause the machine to perform the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical reference numerals generally represent identical components in the example embodiments of the present disclosure. In the accompanying drawings.

DETAILED DESCRIPTION

Principles of the present disclosure will be described below with reference to several example embodiments illustrated in the accompanying drawings. Although the drawings show example embodiments of the present disclosure, it should be understood that these embodiments are merely described to enable those skilled in the art to better understand and then implement the present disclosure, and not in any way limit the scope of the present disclosure.

The term "include" and variants thereof used herein indicate open-ended inclusion, that is, "including but not limited to." Unless otherwise stated, the term "or" means "and/or." The term "based on" denotes "at least partially based on." The terms "an example embodiment" and "an embodiment" denote "at least one example embodiment." The term "another embodiment" means "at least one further embodiment." The terms "first," "second," and the like may refer to different or the same objects. Other explicit and implicit definitions may also be included below.

As discussed above, there are some drawbacks in using a USB memory to upgrade an operating system. Using USB for installation is a conventional method of installing an operating system. For example, after the operating system is upgraded, when the system fails, an image file of an old version has usually been deleted, and the operating system cannot roll back to the previous version, that is, the system cannot cope with the system failure well. In addition, there is no automatic mechanism to establish a stable operating system upgrading procedure. After the operating system is upgraded, a backup image will not be upgraded accordingly.

If the system fails, the operating system will be degraded to a previous version stored in the USB memory. However, if the USB memory is not correctly inserted into the device or is damaged at the moment, the operating system will not be restored. Therefore, the protection for the operating system after system upgrading is weak.

Embodiments of the present disclosure provide a solution for managing an operating system to solve one or more of the above problems and other potential problems. In the solution, there are at least two storage devices for the system. When the system is upgraded from a first version to a second version, a system image file of the first version is stored in both of the two storage devices. Then, operation conditions of the system are monitored. If the system operates normally within a predetermined first time period, a system image of the second version is used to replace the system image file of the first version in one storage device, but the system image file of the first version in the other storage device is not updated. Thus, in subsequent operation of the system, in case of an abnormality, the two versions may be used for selectively restoring the system. In this way, stability of the operating system after an upgrade is improved.

Figure 1:
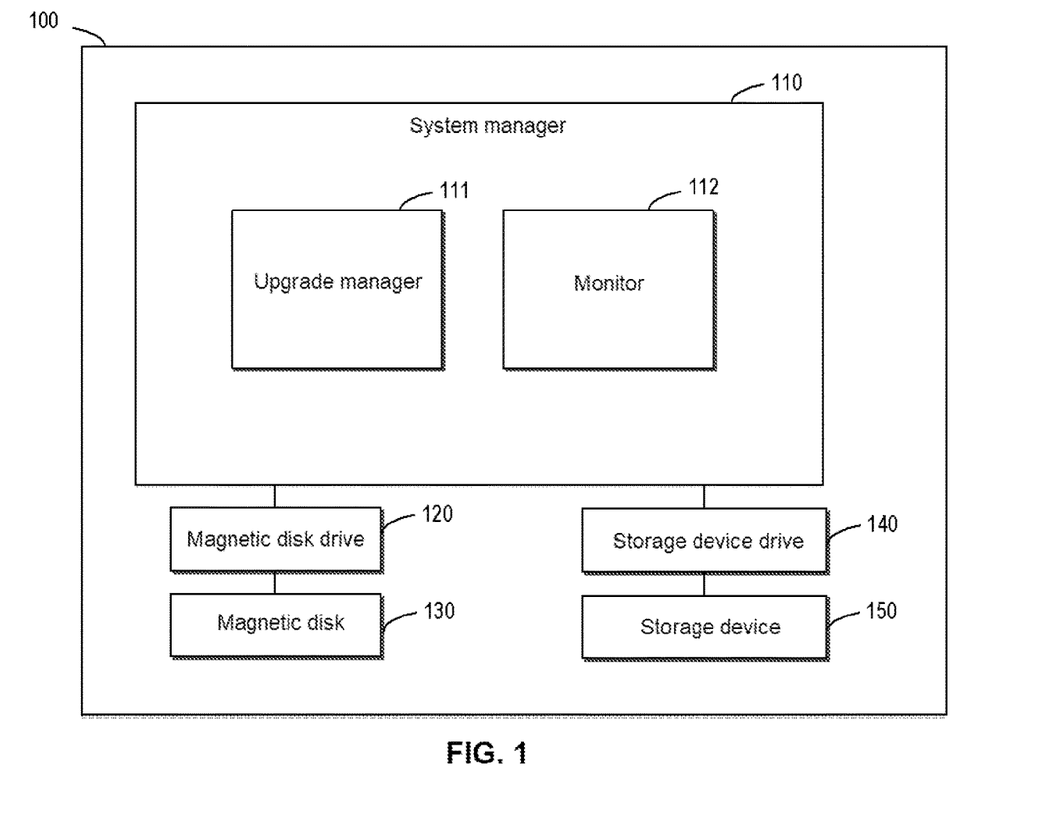
FIG. 1 shows a schematic diagram of an example system in which embodiments of the present disclosure may be implemented.

FIG. 1 shows a schematic diagram of example system 100 in which an embodiment of the present disclosure may be implemented. As shown in FIG. 1, system 100 includes system manager 110, magnetic disk drive 120 and magnetic disk 130 coupled with the system manager, storage device drive 140, and storage device 150. It should be understood that the architecture and functions of system 100 are described for illustrative purposes only, and do not imply any limitation to the scope of the present disclosure. Embodiments of the present disclosure may also be applied to environments involving data protection systems with different structures and/or functions.

System manager 110 includes upgrade manager 111 and monitor 112. Upgrade manager 111 may manage upgrade behaviors of the system, for example, determine whether the system should be upgraded, to which version the system is to be upgraded, and an image file stored in which position is to be upgraded. Monitor 112 may monitor operation statuses of various components in the system, and when detecting an abnormality, send a warning to the system, especially to a corresponding functional component in the system. Monitor 112 may, for example, monitor the operation status of the operating system, and may also monitor the status of storage device 150 or magnetic disk 130. Magnetic disk 130 may be a storage device where the operating system is installed. Storage device 150 may, for example, be a removable (pluggable) storage device (such as a USB memory or an SD card, where SD illustratively denotes "secure digital"). In this case, monitor 112 may, for example, monitor whether storage device 150 is online, whether there is an abnormality, whether the device is correctly inserted, and whether it is under write-protection.

Storage device 150 for the system may, for example, be an IDSDM (internal dual SD module) with dual SD cards. The IDSDM includes, in addition to the dual SD cards, an adapter into which the two SD cards may be inserted. Normally, data stored in the two SD cards is redundant, that is, they store exactly the same content. Any of the two SD cards may serve as a main card. For example, if two new SD cards are installed in the IDSDM, SD1 is an active (main) card, and SD2 is a backup card. Data is written on the two cards, but is read from SD1. At any time, if SD1 fails or is removed, SD2 automatically becomes the active (main) card.

Example embodiments of the present disclosure will be described in detail below with reference to FIG. 2 to FIG. 4.

Figure 2:
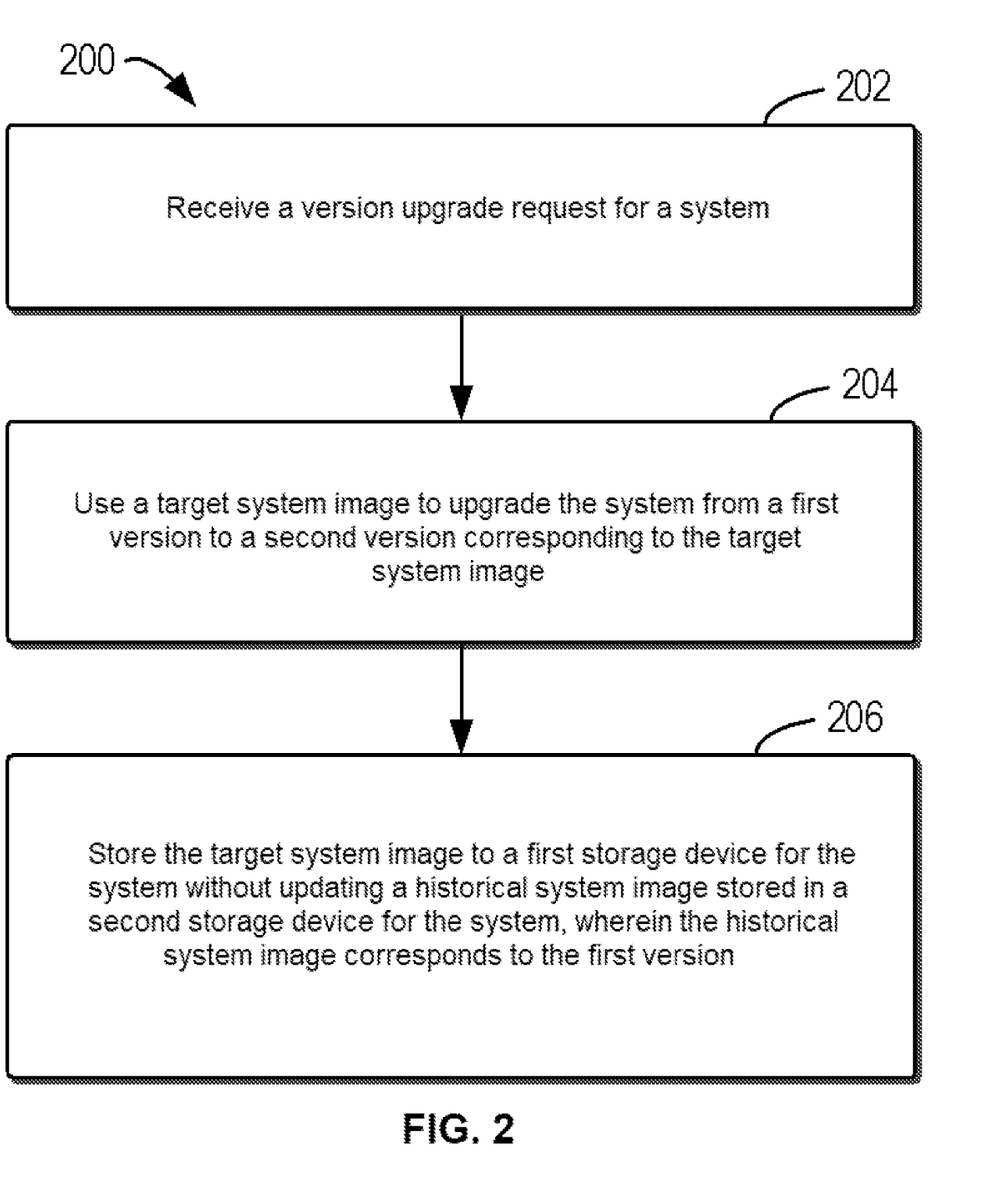
FIG. 2 shows a flow chart of an example method for managing an operating system according to an embodiment of the present disclosure.

FIG. 2 shows a flow chart of example method 200 for managing an operating system according to an embodiment of the present disclosure. Method 200 may be executed, for example, by system manager 110 as shown in FIG. 1.

At block 202, system manager 110 receives a version upgrade request for the system. Upon receiving the upgrade request, system manager 110 may confirm whether a new image file of a target version is available. The image file of the target version is, for example, downloaded into a storage device for the system.

At block 204, system manager 110 uses a target system image to upgrade the system from a first version to a second version corresponding to the target system image. After system manager 110 confirms that the image file of the target version is available, upgrade may be performed.

System manager 110 judges whether the system operates normally within a first time period. If it is determined that the system operates normally within the first time period, at block 206, system manager 110 stores the target system image into a first storage device for the system without updating a historical system image stored in a second storage device for the system. The historical system image corresponds to the first version.

In some embodiments, if system manager 110 determines that the system operates abnormally within the first time period, it will use an image stored in the first storage device to cause the system to roll back. In some embodiments, the first storage device and the second storage device may be removable storage devices. In some embodiments, the first storage device and the second storage device may be a first SD card and a second SD card in an IDSDM. Before the system is upgraded, an image file of the same version is stored in both the first storage device and the second storage device, and is stored until system manager 110 determines that the system operates normally within the first time period; and the image file of an old version, i.e., the first version, stored in any of the two storage devices will be replaced with an image file of a new version, i.e., the second version. At the moment, the two storage devices store image files of different versions, and when the system operates abnormally afterwards, the image file of the first version or the image file of the second version may be selectively used to reset the system. In addition, corresponding replacement may be performed when an image file is damaged. In this way, the stability of the operating system against system abnormalities after upgraded is improved, and it is ensured that the abnormalities can be automatically handled.

It should be understood that the number of storage devices described here is only illustrative and not intended to limit the scope of the present disclosure. A different number of storage devices may be arranged according to specific application scenarios, and image files of different versions may be respectively stored.

Figure 3A:
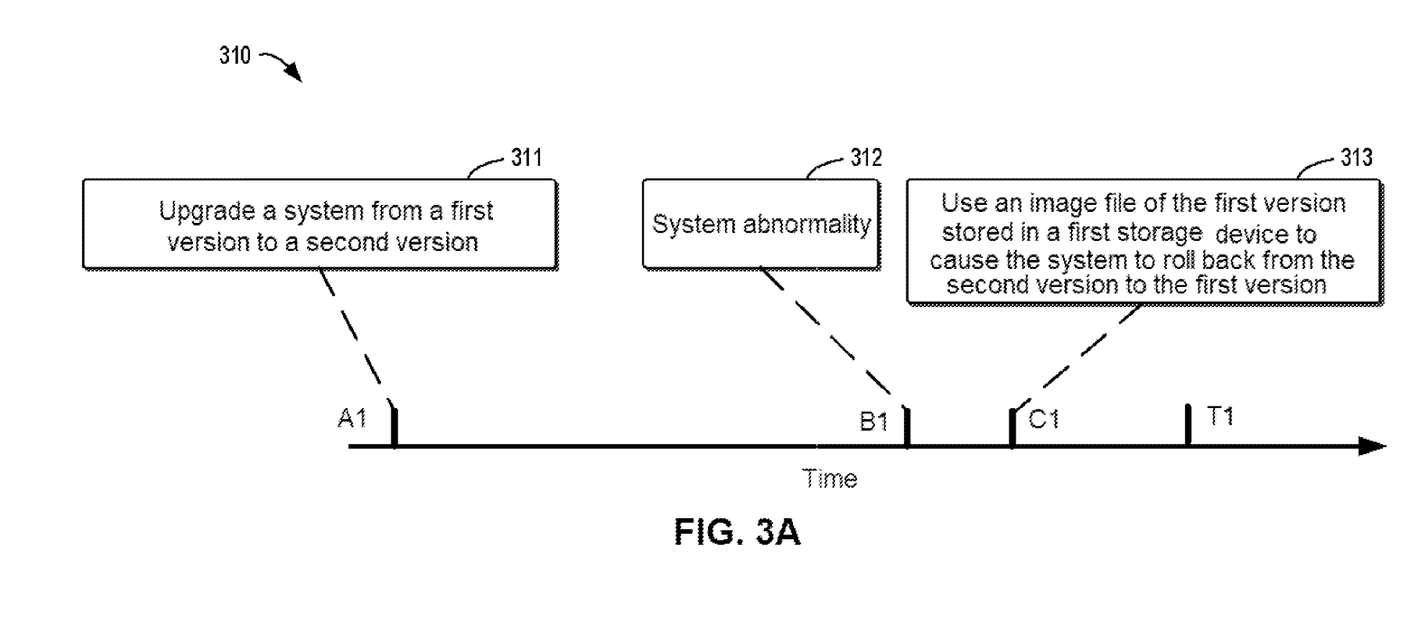
FIGS. 3A-3C show sequence charts of example updating mechanisms of images according to some embodiments of the present disclosure.
Figure 3B:
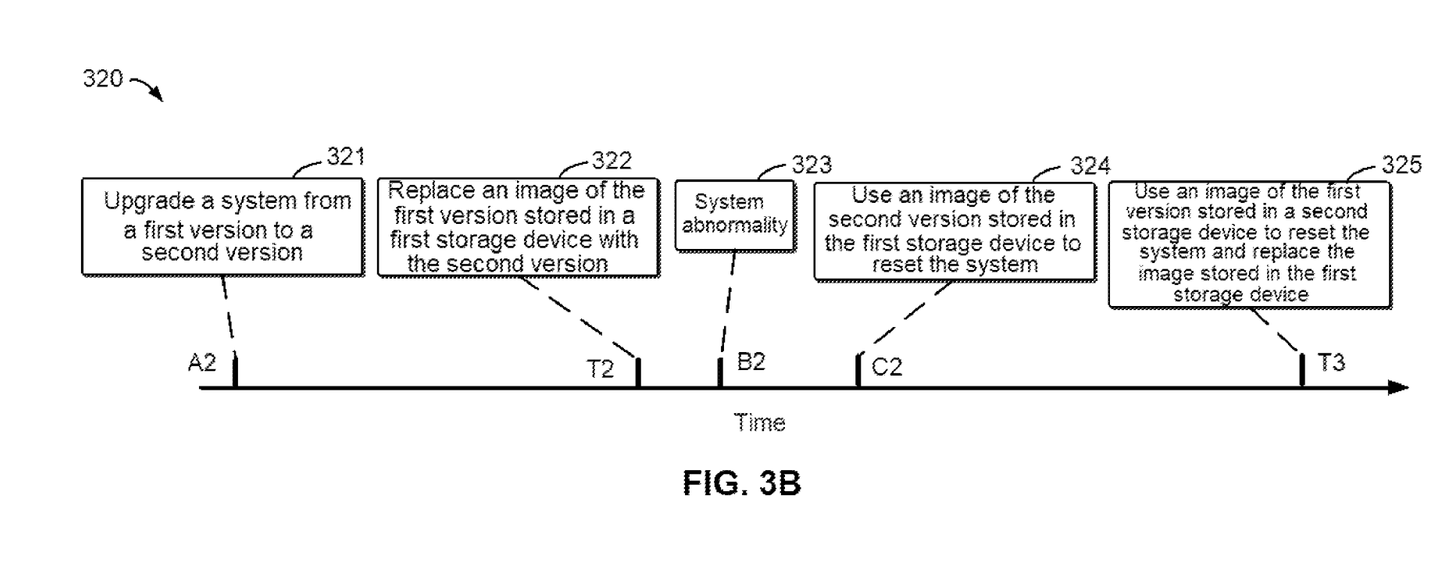
Figure 3C:
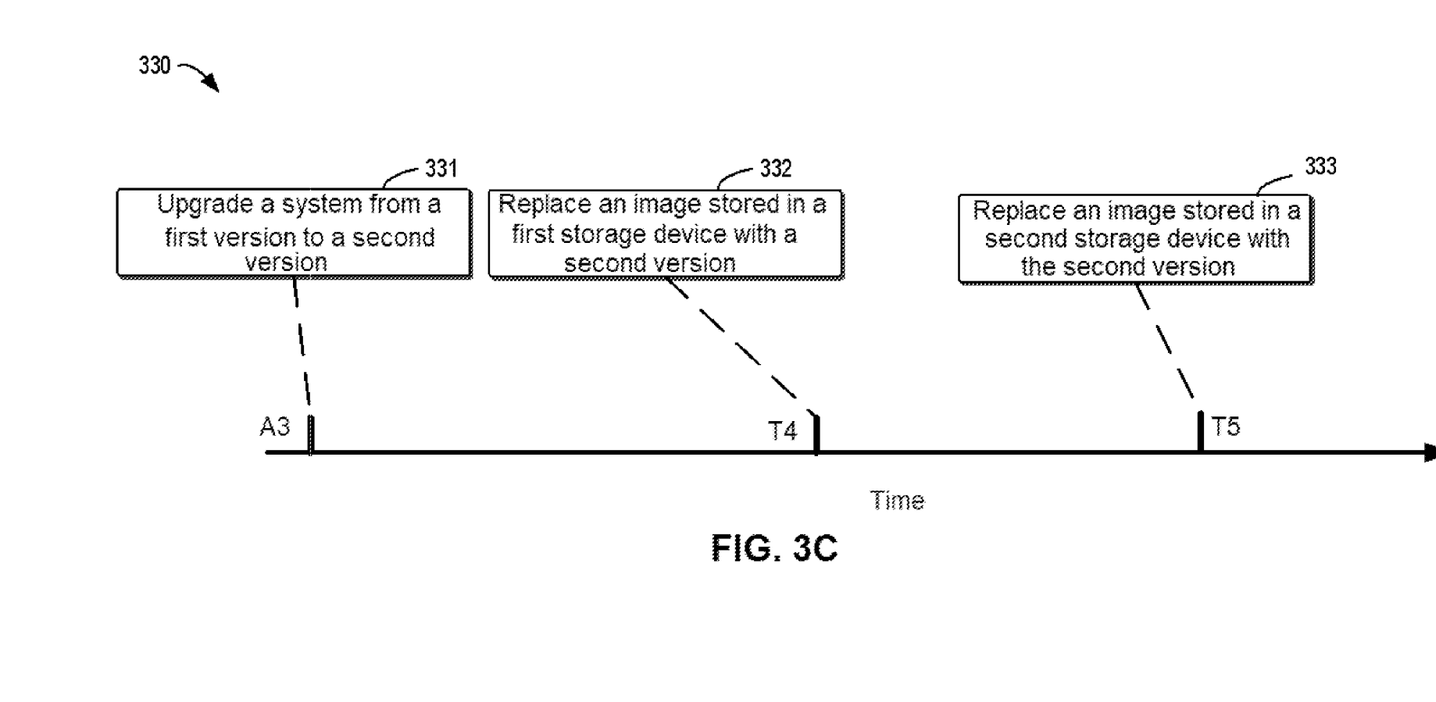

FIGS. 3A-3C show sequence charts of example updating mechanisms 310-330 of images according to some embodiments of the present disclosure. The updating mechanisms or updating methods shown in FIGS. 3A-3C may, for example, be executed by system manager 110 in FIG. 1. It should be understood that updating mechanisms 310-330 may include additional actions not shown and/or may omit shown actions, and the scope of the present disclosure is not limited in this respect.

FIG. 3A shows a sequence chart of image updating mechanism 310 according to an embodiment of the present disclosure. As shown in FIG. 3A, at moment A1, at block 311, an image file of a second version is used to upgrade the system from a first version to the second version. In some embodiments, the storage device associated with the system during operation is a conventional storage device with a large capacity, for example, magnetic disk 130. In some embodiments, when upgrade is performed, an image file of a new version may be downloaded to the magnetic disk, and the image file of the new version in the magnetic disk is used for upgrade. At the moment, an image file of a previous version used in a previous upgrade may be stored in the first storage device and the second storage device. In some embodiments, an image file of an earlier version may also be stored in the first storage device and the second storage device. For example, the earlier version may have proven to be the safest and the most stable of multiple distinct versions.

After the system is successfully upgraded, at moment B1 before predetermined moment T1, at block 312, system manager 110, or more particularly monitor 112 in system manager 110, detects that the system operates abnormally and determines that the new version is unstable, and the system needs to be reset. Here, A1 to T1 may correspond to the first time period mentioned above. At moment C1, at block 313, because of an abnormality of the system, the image file in the conventional storage device is unavailable or deleted, and at the moment, the image file of the first version stored in the first storage device is used to cause the system to roll back to the first version. In some embodiments, moment B1 and moment C1 may be basically the same moment, i.e., a roll back operation is immediately performed after an abnormality of the system is detected. In some embodiments, moment C1 is a moment a period of time after moment B1, and during the period, the system may also execute data backup. In some embodiments, when the system manager confirms that the system needs to be reset, it may automatically change a starting sequence in BIOS, and the system, when started, first enters the first storage device as a main storage device, so that an image stored in the first storage device is used for restoring the system. After BIOS setting is completed, the system may be automatically restarted to be restored.

FIG. 3B shows a sequence chart of image updating mechanism 320 according to another embodiment of the present disclosure. As shown in FIG. 3B, at moment A2, at block 321, an image file of a second version is used to upgrade the system from a first version to the second version. After the system is upgraded successfully, if monitor 112 determines that the system is always operating normally until predetermined moment T2, it means that the second version is stable, so at block 322, an image of the first version stored in the first storage device as the main storage device is replaced with the second version. In some embodiments, the time period between moment A2 and moment T2 may, for example, correspond to the first time period mentioned above. At moment B2 after moment T2, at block 323, monitor 112 detects that the system operates abnormally, so the system needs to be reset. At moment C2, at block 324, the image of the second version stored in the first storage device is used to reset the system, i.e., the system is restored to initial settings of the second version. In some embodiments, moment B2 and moment C2 may be basically the same moment, i.e., a restoration operation is performed immediately after the system abnormality is detected. In some embodiments, moment C2 is a moment a period of time after moment B2, and during the period, the system may also execute data backup. After that and until moment T3, the system may have multiple abnormalities (for example, exceeding the acceptable predetermined number of times) and be restored multiple times. System manager 110 judges that the second version is not stable enough. At block 325, the image of the first version stored in the second storage device is used to reset the system and replace the image stored in the first storage device. That is, the system is caused to roll back from the second version to the first version, and the image file of the second version in the first storage device is replaced with the first version. In some embodiments, when system manager 110 determines that the system needs to roll back to the first version, the main storage device may be automatically changed from the first storage device to the second storage device, and then the system is reset by the BIOS setting and restarting steps discussed above. In this way, by storing different versions of image files in different storage devices, whether to use a new version to restore the system or to use an old version to roll the system back and replace the stored old version is selected based on practical using conditions, so stability of the operating system is ensured.

FIG. 3C shows a sequence chart of image updating mechanism 330 according to another embodiment of the present disclosure. As shown in FIG. 3C, at moment A3, at block 331, an image file of a second version is used to upgrade the system from a first version to the second version. After the system is upgraded, if there is no abnormality of the system until predetermined moment T4, it means that the second version is stable, so at block 332, an image of the first version stored in a first storage device as the main storage device is replaced with the second version. Then, if there is still no abnormality of the system until moment T5, it further means that the second version is stable, so at block 333, the image stored in the second storage device is replaced with the second version. Afterwards, the system may operate normally according to the second version.

In some embodiments, system manager 110, and more particularly monitor 112, may monitor operation statuses of the first storage device and the second storage device. For example, when the storage device is an SD card in the IDSDM, the operation status may be device present, i.e., the storage device is correctly inserted into an adapter. The operation status may be device absent, i.e., the storage device is not correctly inserted into the adapter. The operation status may also be device offline or write-protected. Statuses other than device present are regarded by monitor 112 as abnormalities of the storage device, which will more particularly cause the aforesaid updating mechanism to be unavailable. Therefore, monitor 112 will generate a warning to facilitate further processing. In some embodiments, monitoring of operation statuses of the storage devices may be performed in real time, or may be performed at a predetermined time interval.

In some embodiments, integrity of the image files may also be determined, and when it is determined that one of the image files stored in the storage devices is damaged, the damaged image file is replaced with an undamaged image file. In some embodiments, inspection of integrity of the image files may be performed at a predetermined time interval. In some embodiments, inspection of integrity of the image files may be executed based on hashed values. For example, when the system is upgraded from the first version to the second version, hashed values of the image file of the second version, for example, the sum of hashed values of all files included by the image file, may be calculated (for example, using md5 value or SHA1 value), and a result is stored in the system. Alternatively, when an image file is copied to a storage device, hashed values associated with the image file may also be stored into the storage device to facilitate subsequent inspection. In some embodiments, when the system detects that current hashed values of an image file are different from initial hashed values, it will be confirmed that the current image file is incomplete and needs to be replaced. For example, an image file which is still stored in a conventional storage device or a complete image file in another storage device may be used for replacement.

Figure 4:
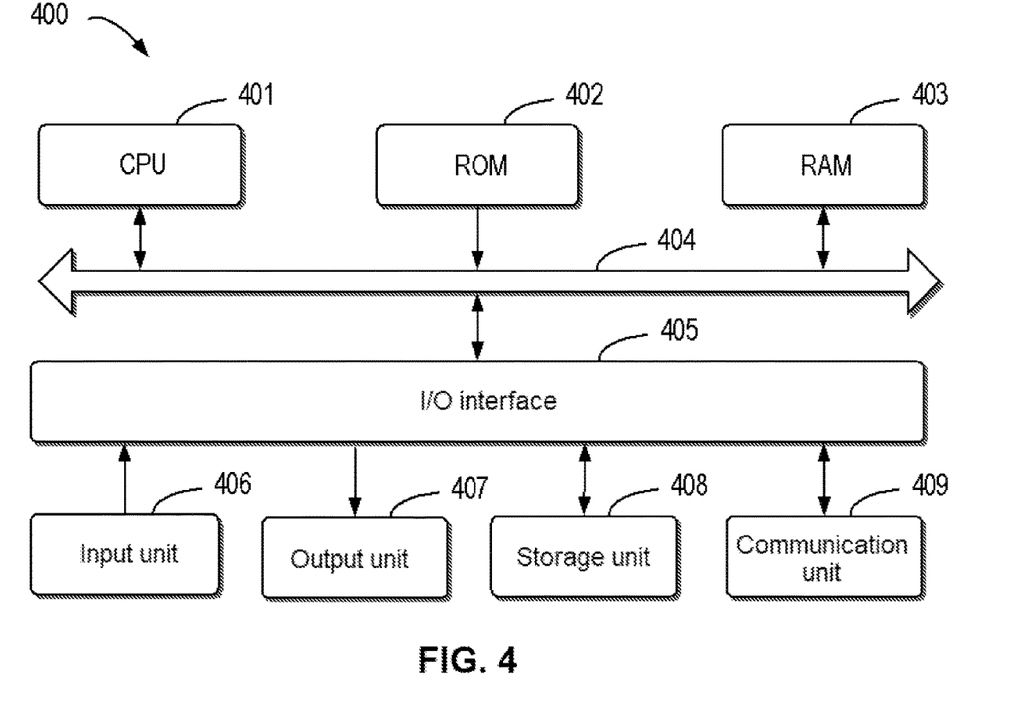
FIG. 4 shows a block diagram of an example device that may be configured to implement embodiments of the present disclosure.

FIG. 4 shows a schematic block diagram of example device 400 that may be configured to implement embodiments of the present disclosure. As shown in FIG. 4, device 400 includes central processing unit (CPU) 401 which may perform various appropriate actions and processing according to computer program instructions stored in read-only memory (ROM) 402 or computer program instructions loaded from storage unit 408 to random access memory (RAM) 403. RAM 403 may further store various programs and data required by operations of device 400. CPU 401, ROM 402, and RAM 403 are connected to each other through bus 404. Input/output (I/O) interface 405 is also connected to bus 404.

A number of components in device 400 are connected to I/O interface 405, including: input unit 406, such as a keyboard and a mouse; output unit 407, such as various types of displays and speakers; storage unit 408, such as a magnetic disk and an optical disc; and communication unit 409, such as a network card, a modem, or a wireless communication transceiver. Communication unit 409 allows device 400 to exchange information/data with other devices through a computer network such as the Internet and/or various telecommunication networks.

The various processes and processing described above, for example, method 200, may be executed by CPU 401. For example, in some embodiments, method 200 may be implemented as a computer software program that is tangibly included in a machine-readable medium such as storage unit 408. In some embodiments, part of or all the computer programs may be loaded and/or installed onto device 400 via ROM 402 and/or communication unit 409. When a computer program is loaded into RAM 403 and executed by CPU 401, one or more actions of method 200 described above may be implemented.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives the computer-readable program instructions from the network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce apparatuses for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable storage medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Example embodiments of the present disclosure have been described above. The above description is illustrative, rather than exhaustive, and is not limited to the disclosed various embodiments. Numerous modifications and alterations will be apparent to those of ordinary skill in the art without departing from the scope and spirit of the illustrated embodiments. The selection of terms used herein is intended to best explain the principles and practical applications of the various embodiments or the improvements to technologies on the market, so as to enable persons of ordinary skill in the art to understand the embodiments disclosed herein.

What is claimed is:

1. A method, comprising:
    receiving a version upgrade request for a system;
    using a target system image to upgrade the system from a first version to a second version corresponding to the target system image; and
    storing, in response to determining that the system operates normally within a first time period, the target system image to a first storage device for the system without updating a historical system image stored in a second storage device for the system, wherein the historical system image corresponds to the first version;
    wherein using the target system image to upgrade the system comprises using the target system image to upgrade at least an operating system portion of the system.

2. The method according to claim 1, further comprising:
    updating, in response to determining that the system operates normally within a second time period after the first time period, the historical system image stored in the second storage device to the target system image.

3. The method according to claim 2, wherein the first storage device stores a first image file corresponding to a target historical image, the second storage device stores a second image file corresponding to the target historical image, and the method further comprises:
    determining integrity of the first image file and the second image file; and
    replacing, in response to at least one of the first image file and the second image file being damaged, the damaged image file with an undamaged image file in the first image file and the second image file.

4. The method according to claim 3, wherein determining the integrity of the first image file and the second image file comprises:
    determining the integrity of the first image file and the second image file based on hashed values of the first image file and the second image file.

5. The method according to claim 1, further comprising:
    resetting, in response to determining that the system is abnormal in the first time period, the system by using the target system image stored in the first storage device.

6. The method according to claim 5, further comprising:
    resetting, in response to determining that the number of times that the system is abnormal within a third time period after the first time period exceeds a preset threshold, the system to the first version by using the historical system image stored in the second storage device; and
    replacing the target system image stored in the first storage device with the historical system image.

7. The method according to claim 1, further comprising:
    generating, in response to determining that at least one of the first storage device and the second storage device is abnormal, a warning corresponding to the abnormality,
    wherein the abnormality comprises at least one of the following: device failure, device offline, device absent, or device write-protected.

8. An electronic device, comprising:
    a processor; and
    a memory coupled to the processor, wherein the memory has instructions stored therein, and the instructions, when executed by the processor, cause the electronic device to execute actions comprising:
    receiving a version upgrade request for a system;
    using a target system image to upgrade the system from a first version to a second version corresponding to the target system image; and
    storing, in response to determining that the system operates normally within a first time period, the target system image to a first storage device for the system without updating a historical system image stored in a second storage device for the system, wherein the historical system image corresponds to the first version;
    wherein using the target system image to upgrade the system comprises using the target system image to upgrade at least an operating system portion of the system.

9. The electronic device according to claim 8, wherein the actions further comprise:
updating, in response to determining that the system operates normally within a second time period after the first time period, the historical system image stored in the second storage device to the target system image.

10. The electronic device according to claim 9, wherein the first storage device stores a first image file corresponding to a target historical image, the second storage device stores a second image file corresponding to the target historical image, and the actions further comprise:
determining integrity of the first image file and the second image file; and
replacing, in response to at least one of the first image file and the second image file being damaged, the damaged image file with an undamaged image file in the first image file and the second image file.

11. The electronic device according to claim 10, wherein determining the integrity of the first image file and the second image file comprises:
determining the integrity of the first image file and the second image file based on hashed values of the first image file and the second image file.

12. The electronic device according to claim 8, wherein the actions further comprise:
resetting, in response to determining that the system is abnormal in the first time period, the system by using the target system image stored in the first storage device.

13. The electronic device according to claim 12, wherein the actions further comprise:
resetting, in response to determining that the number of times that the system is abnormal within a third time period after the first time period exceeds a preset threshold, the system to the first version by using the historical system image stored in the second storage device; and
replacing the target system image stored in the first storage device with the historical system image.

14. The electronic device according to claim 8, wherein the actions further comprise:
generating, in response to determining that at least one of the first storage device and the second storage device is abnormal, a warning corresponding to the abnormality, wherein the abnormality comprises at least one of the following: device failure, device offline, device absent, or device write-protected.

15. A computer program product tangibly stored on a non-transitory computer-readable storage medium and comprising machine-executable instructions that, when executed by a machine, cause the machine to perform a method, the method comprising:
receiving a version upgrade request for a system;
using a target system image to upgrade the system from a first version to a second version corresponding to the target system image; and
storing, in response to determining that the system operates normally within a first time period, the target system image to a first storage device for the system without updating a historical system image stored in a second storage device for the system, wherein the historical system image corresponds to the first version;
wherein using the target system image to upgrade the system comprises using the target system image to upgrade at least an operating system portion of the system.

16. The computer program product according to claim 15, further comprising:
updating, in response to determining that the system operates normally within a second time period after the first time period, the historical system image stored in the second storage device to the target system image.

17. The computer program product according to claim 16, wherein the first storage device stores a first image file corresponding to a target historical image, the second storage device stores a second image file corresponding to the target historical image, and the method further comprises:
determining integrity of the first image file and the second image file; and
replacing, in response to at least one of the first image file and the second image file being damaged, the damaged image file with an undamaged image file in the first image file and the second image file.

18. The computer program product according to claim 17, wherein determining the integrity of the first image file and the second image file comprises:
determining the integrity of the first image file and the second image file based on hashed values of the first image file and the second image file.

19. The computer program product according to claim 15, further comprising:
resetting, in response to determining that the system is abnormal in the first time period, the system by using the target system image stored in the first storage device.

20. The computer program product according to claim 19, further comprising:
resetting, in response to determining that the number of times that the system is abnormal within a third time period after the first time period exceeds a preset threshold, the system to the first version by using the historical system image stored in the second storage device; and
replacing the target system image stored in the first storage device with the historical system image.

* * * * *